United States Patent
Aung et al.

(10) Patent No.: US 8,661,845 B2
(45) Date of Patent: Mar. 4, 2014

(54) HEAT EXCHANGER

(75) Inventors: Thuya Aung, Kariya (JP); Nobuharu Kakehashi, Toyoake (JP); Tomohiko Nakamura, Obu (JP); Hideaki Sato, Anjo (JP)

(73) Assignee: Denso Corporation, Kariya (JP)

( * ) Notice: Subject to any disclaimer, the term of this patent is extended or adjusted under 35 U.S.C. 154(b) by 1258 days.

(21) Appl. No.: 12/455,320

(22) Filed: Jun. 1, 2009

(65) Prior Publication Data

US 2009/0293535 A1 Dec. 3, 2009

(30) Foreign Application Priority Data

Jun. 2, 2008 (JP) ................................ 2008-144644

(51) Int. Cl.
| | |
|---|---|
| F25B 1/06 | (2006.01) |
| F25B 39/02 | (2006.01) |
| F25B 1/00 | (2006.01) |
| B29C 47/88 | (2006.01) |
| F24F 3/04 | (2006.01) |
| F28F 7/00 | (2006.01) |
| F28F 9/02 | (2006.01) |
| B05B 1/14 | (2006.01) |
| F16L 41/00 | (2006.01) |

(52) U.S. Cl.
USPC ............ 62/500; 62/116; 62/519; 62/524; 62/525; 62/526; 165/174; 165/139; 165/123; 165/120; 239/548; 239/552; 239/597; 239/601; 137/561 A

(58) Field of Classification Search
USPC ............ 62/500, 116, 519, 524–526; 165/174, 165/139, 123, 120; 239/548, 552, 597, 601; 137/561 A
See application file for complete search history.

(56) References Cited

U.S. PATENT DOCUMENTS

| | | | |
|---|---|---|---|
| 1,942,831 A * | 1/1934 | Perry ............................... | 237/74 |
| 2,964,248 A * | 12/1960 | O'Brien et al. ................ | 239/544 |
| 4,744,748 A * | 5/1988 | Raines et al. .................. | 431/353 |
| 6,698,509 B2 * | 3/2004 | Rong ............................ | 165/153 |

(Continued)

FOREIGN PATENT DOCUMENTS

| | | |
|---|---|---|
| JP | 5-340649 | 12/1993 |
| JP | 2001-141333 | 5/2001 |
| JP | 2004-116809 | 4/2004 |

OTHER PUBLICATIONS

Ishizaka et al. JP 2006-012461 Translation, Feb. 8, 2007.*

(Continued)

*Primary Examiner* — Allen Flanigan
*Assistant Examiner* — Filip Zec
(74) *Attorney, Agent, or Firm* — Harness, Dickey & Pierce, PLC

(57) ABSTRACT

A heat exchanger includes a heat exchanging section for performing heat exchange between a refrigerant and a cooling medium and a passage section. The passage section includes a first passage and a second passage for supplying the refrigerant to the heat exchanging section and a supply passage for supplying the refrigerant to the first passage and the second passage. The first passage and the second passage define a first opening portion and a second opening portion opening at an end of the supply passage. A minimum distance between an opening edge of the first opening portion and an inner surface of the supply passage is equal to a minimum distance between an opening edge of the second opening portion and the inner surface of the supply passage.

19 Claims, 9 Drawing Sheets

(56) References Cited

U.S. PATENT DOCUMENTS

| | | | |
|---|---|---|---|
| 2001/0010263 A1* | 8/2001 | Ichiyanagi | 165/178 |
| 2003/0209030 A1* | 11/2003 | Nishida et al. | 62/500 |
| 2005/0082395 A1* | 4/2005 | Gardega | 239/548 |
| 2005/0156061 A1* | 7/2005 | Lan et al. | 239/548 |
| 2005/0268644 A1* | 12/2005 | Oshitani et al. | 62/500 |
| 2007/0039724 A1* | 2/2007 | Trumbower et al. | 165/174 |
| 2007/0163294 A1* | 7/2007 | Aung et al. | 62/500 |
| 2007/0169510 A1 | 7/2007 | Ishizaka et al. | |
| 2007/0169511 A1 | 7/2007 | Ishizaka et al. | |
| 2007/0169512 A1 | 7/2007 | Ishizaka et al. | |
| 2008/0105318 A1* | 5/2008 | Leone | 137/896 |

OTHER PUBLICATIONS

Office Action dated Jun. 22, 2010 in Japanese Application No. 2008-144644 with English translation thereof.

Office Action dated Nov. 9, 2010 in Japanese Application No. 2008-144644 with English translation thereof.

* cited by examiner

HEAT EXCHANGER

CROSS REFERENCE TO RELATED APPLICATION

This application is based on Japanese Patent Application No. 2008-144644 filed on Jun. 2, 2008, the disclosure of which is incorporated herein by reference.

FIELD OF THE INVENTION

The present invention relates to a heat exchanger.

BACKGROUND OF THE INVENTION

For example, a heat exchanger is known as described in JP2007-192504A. A unit for an ejector-type refrigerating cycle described in JP2007-192504A includes an ejector, a first evaporator, a second evaporator, a throttle device, a connection block, and an intervening plate. These components are integrated into an integrated unit having one refrigerant inlet and one refrigerant outlet.

The connection block is formed with a recessed groove bent into a substantially V-shape on an end surface facing the intervening plate. The intervening plate is formed with a recessed groove to oppose the groove of the connection block. These grooves form a refrigerant passage. The refrigerant inlet is provided to open at an end of the refrigerant passage. A main passage opening portion defining an opening is provided at an intermediate portion of the refrigerant passage to communicate with an inlet of the ejector. A branch passage opening portion defining an opening is provided at the other end of the refrigerant passage to communicate with the throttle device.

In the refrigerant passage of JP2007-192504A, a refrigerant is in a gas and liquid two-phase condition. A flow rate of the refrigerant in the refrigerant passage varies in accordance with a load of the refrigerating cycle. In such a case, it is difficult to distribute the refrigerant into the ejector and the throttle device at a stable ratio. Thus, the amount of refrigerant distributed to the ejector and the amount of refrigerant distributed to the throttle device are likely to fluctuate.

SUMMARY OF THE INVENTION

The present invention is made in view of the foregoing matter, and it is an object of the present invention to provide a heat exchanger exhibiting a stable refrigerant distribution performance.

According to an aspect of the present invention, a heat exchanger includes a heat exchanging section for performing heat exchange between a refrigerant and a cooling medium, and a passage section. The passage section includes a first passage and a second passage for supplying the refrigerant to the heat exchanging section and a supply passage for supplying the refrigerant to the first passage and the second passage. The first passage and the second passage respectively have a first opening portion and a second opening portion defining openings at an end of the supply passage. A minimum distance between an opening edge of the first opening portion and an inner surface of the supply passage and a minimum distance between an opening edge of the second opening portion and the inner surface of the supply passage are equal to each other.

A liquid-phase refrigerant of a gas and liquid two-phase refrigerant flows along the inner surface of the supply passage, and a vapor-condition gas and liquid two-phase refrigerant flows through a center of the supply passage. As a result, the liquid-phase refrigerant forms a liquid film on the inner surface of the supply passage. The thickness of the liquid film varies if the flow rate of the refrigerant varies in accordance with an operation load of the heat exchanger. Further, a refrigerant distribution ratio, which influences on devices connected downstream of the first and second passages, is more affected by a change in an inflow rate of the liquid-phase refrigerant into the passages than by a change in an inflow rate of a gas-phase refrigerant into the passages.

In the above structure, the minimum distance between the first opening portion and the inner surface of the supply passage and the minimum distance between the second opening portion and the inner surface of the supply passage are equal to each other. Therefore, the distribution ratio of the liquid-phase refrigerant into the passages is easily stabilized. As such, the heat exchanger exhibiting a stable refrigerant distribution performance can be provided.

For example, the shape of the opening edge of the first opening portion is geometrically similar to the shape of the opening edge of the second opening portion. In such a case, the distribution ratio of the refrigerant into the first and second passages can be further stabilized.

For example, the supply passage has a circular cross-section. In such a case, the refrigerant flows annularly in the supply passage. As a result, the liquid-phase refrigerant easily flows along the inner surface of the supply passage. Accordingly, the distribution ratio of the refrigerant into the first and second passages can be further stabilized.

For example, the opening edge of the first opening portion includes an arcuate portion, and the minimum distance is defined between the arcuate portion and the inner surface of the supply passage. Likewise, the opening edge of the second opening portion includes an arcuate portion, and the minimum distance is defined between the arcuate portion and the inner surface of the supply passage. In such a case, the distribution ratio of the liquid-phase refrigerant into the passages can be smoothly varied in accordance with the change in the amount of the refrigerant passing through the supply passage, and hence a heat exchanger having a stable performance can be provided.

For example, the arcuate portion of the opening edge of the first opening portion defines a radius that is in a range between 0.5 and 2.0 times of a radius of the arcuate portion of the opening edge of the second opening portion. In such a case, the distribution ratio of the refrigerant into the first passage and the second passage can be further stabilized.

For example, the first opening portion and the second opening portion each have a circular shape. In such a case, costs for processing the first passage and the second passage can be reduced. Further, a heat exchanger having the first passage and the second passage with high pressure resistance can be provided.

For example, the first passage and the second passage are disposed such that axes thereof are parallel to an axis of the supply passage. In such a case, a diameter of the supply passage can be reduced, and hence materials costs can be reduced.

For example, the heat exchanging section includes a first heat exchanging part, a second heat exchanging part disposed downstream of the first heat exchanging part with respect to a flow of the cooling medium, an ejector disposed between the first passage and the first heat exchanging part and having a refrigerant suction port for drawing the refrigerant from the second heat exchanging part, and a decompressing part disposed between the second passage and the second heat exchanging part for decompressing the refrigerant. In such a case, a distribution ratio of the refrigerant conducted to the ejector and the refrigerant conducted to a throttle device are easily stabilized. As a result, a heat exchanger exhibiting a stable refrigerant distributing performance can be provided.

For example, the passage section has a distribution block including an insertion passage with a circular cross-section to allow the ejector to be inserted therein and a distribution surface defining the end of the supply passage. The first passage is formed in the distribution block such that its axis is perpendicular to an axis of the insertion passage and the distribution surface, and the second passage is formed in the distribution block such that it axis is perpendicular to the distribution surface. The distribution block is integrated with the heat exchanging section by brazing. In such a case, a heat exchanger capable of stably distributing the refrigerant into the ejector and the throttle device can be easily provided.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Figure 1:
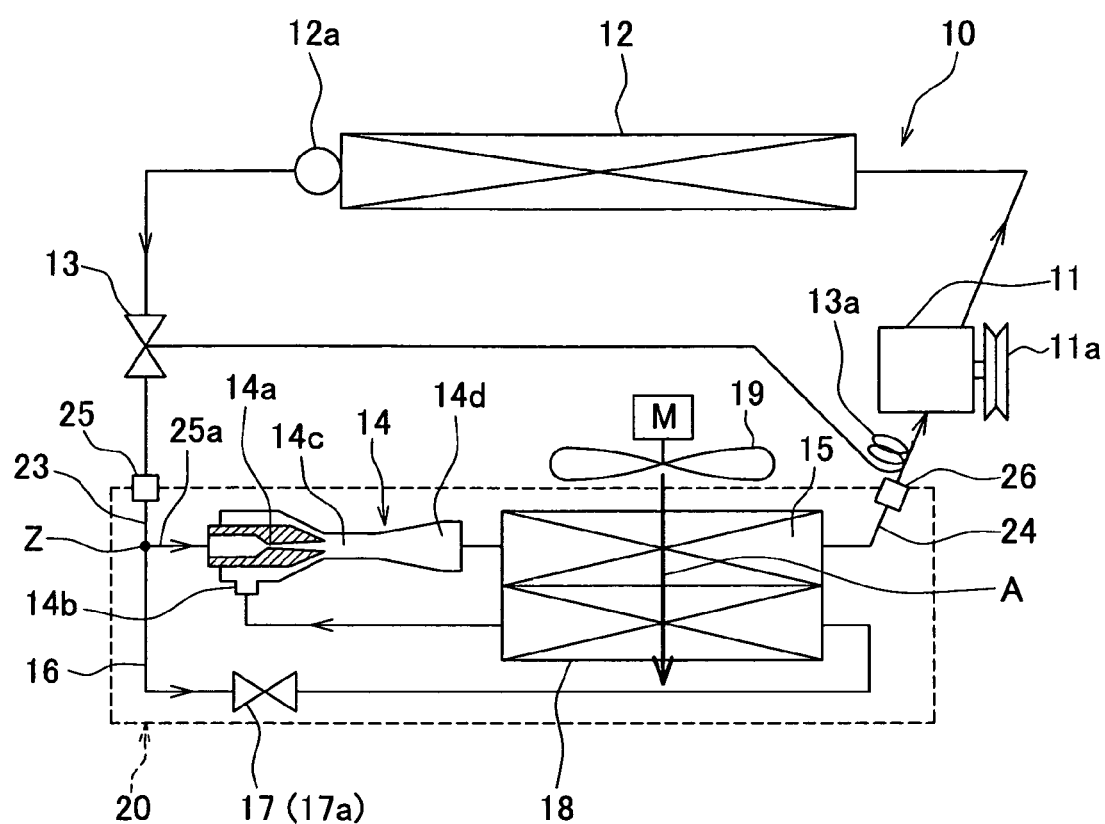
FIG. 1 is a circuit diagram illustrating a flow of refrigerant of a vehicular ejector-type refrigerating cycle according to an embodiment of the present invention.

Hereinafter, a structure of a vehicular ejector-type refrigerating cycle 10 according to an embodiment of the present invention will be described. FIG. 1 is a circuit diagram of the vehicular ejector-type refrigerating cycle 10. A compressor 11 for drawing and compressing a refrigerant is driven by a non-illustrated vehicle engine for traveling through an electromagnetic clutch 11a, a belt and the like.

As the compressor 11, either a variable displacement compressor that can adjust a refrigerant discharge capability by changing a discharge capacity or a fixed displacement compressor that can adjust a refrigerant discharge capability by changing a compressor operation ratio through engagement and disengagement of the electromagnetic clutch 11a can be employed. If an electric compressor is used as the compressor 11, a refrigerant discharge capability can be adjusted by controlling a rotation speed of an electric motor.

A radiator 12 is disposed on a refrigerant discharge side of the compressor 11. The radiator 12 performs heat exchange between a high pressure refrigerant discharged from the compressor 11 and air outside of a passenger compartment blown by a non-illustrated cooling fan, thereby to cool the high pressure refrigerant. As the refrigerant for the ejector-type refrigerating cycle, in the present embodiment, a refrigerant whose high pressure does not exceed a critical pressure, such as a CFC-based refrigerant, or HC-based refrigerant, is used so as to constitute a vapor compression subcritical cycle. Therefore, the radiator 12 serves as a condenser for condensing the refrigerant.

A liquid receiver 12a is provided on a discharge side of the radiator 12. The liquid receiver 12a has a tank shape having a length in a vertical direction. The liquid receiver 12a constitutes a gas-liquid separator that separates the refrigerant into a gas phase and a liquid phase and stores a surplus liquid-phase refrigerant of the refrigerating cycle 10 therein. The liquid receiver 12a is provided with a structure for discharging the liquid-phase refrigerant at a lower portion of the tank shape.

In the present embodiment, the liquid receiver 12a is integrated with the radiator 12. The radiator 12 can be configured to include a condensing heat exchanging part disposed on an upstream location with respect to a flow of the refrigerant, the liquid receiver 12a drawing the refrigerant from the condensing heat exchanging part for separating the refrigerant into a gas-phase and a liquid-phase, and a sub-cooling heat exchanging part for sub-cooling a saturated liquid-phase refrigerant from the liquid receiver 12a.

A thermal expansion valve 13 is provided on an outlet side of the liquid receiver 12a. The thermal expansion valve 13 serves as a decompressing means for decompressing the liquid-phase refrigerant from the liquid receiver 12a. The thermal expansion valve 13 has a temperature sensing part 13a disposed on a suction-side passage of the compressor 11. The thermal expansion valve 13 detects a superheat degree of the refrigerant on a suction side of the compressor 11 based on a temperature and a pressure of the refrigerant on the suction side of the compressor 11 and adjusts a valve opening degree so that the superheat degree of the refrigerant on the suction side of the compressor 11 is controlled to a predetermined value.

An ejector 14 is provided on an outlet side of the thermal expansion valve 13. The ejector 14 serves as a decompression means for decompressing the refrigerant as well as a refrigerant circulation means for circulating the refrigerant by means of a suction effect generated by a refrigerant flow ejected at high velocity. Here, the suction effect can be understood as a dragging effect. Also, the refrigerant circulation means can be understood as a momentum transporting pump.

The ejector 14 has a nozzle portion 14a that further decompresses and expanding refrigerant, which has passed through the thermal expansion valve 13 and has an intermediate pressure, by reducing a passage area, and a refrigerant suction port 14b that is disposed in the same space of a refrigerant jet port of the nozzle portion 14a and suctions gas-phase refrigerant from a second evaporator 18. The ejector 14 further has a mixing portion 14c for mixing high velocity refrigerant from the nozzle portion 14a and the refrigerant suctioned from the refrigerant suction port 14b, downstream of the nozzle portion 14a and the refrigerant suction port 14b with respect to the flow of refrigerant.

Moreover, the ejector 14 has a diffuser portion 14d as a pressure-increasing portion downstream of the mixing portion 14c with respect to the flow of refrigerant. The diffuser portion 14d is configured such that a refrigerant passage area therein gradually increases. The diffuser portion 14d has a function of increasing refrigerant pressure by decreasing the velocity of refrigerant flow. Here, the function of increasing the refrigerant pressure by decreasing the velocity of refrigerant flow can be understood as a function of changing velocity energy of the refrigerant into pressure energy.

A first evaporator 15 is connected to an outlet side of the diffuser portion 14d. An outlet of the first evaporator 15 is connected to a suction port of the compressor 11. Further, an upstream end of a branch passage 16 is connected to a branched point Z between an outlet of the thermal expansion valve 13 and the inlet of the ejector 14. A downstream end of the branch passage 16 is connected to the refrigerant suction port 14b of the ejector 14. The branched point Z in FIG. 1 indicates a branch point of the branch passage 16.

A throttle device 17 is disposed on the branch passage 16. Further, a second evaporator 18 is disposed downstream of the throttle device 17 with respect to the refrigerant flow. The throttle device 17 serves as a decompression means having a function of adjusting a flow rate of the refrigerant toward the second evaporator 18. The throttle device 17 can be understood as another decompression part for decompressing the refrigerant separately from the ejector 14. Specifically, the throttle device 17 can be constructed of a fixed throttle such as a capillary tube or an orifice. In the present embodiment, a capillary tube 17a is employed.

In a case where the ejector-type refrigerating cycle 10 of the present embodiment is employed to a refrigerating cycle apparatus for a vehicular air conditioner, a space to be cooled is an inside of a passenger compartment. In a case where the ejector-type refrigerating cycle 10 of the present embodiment is employed to a refrigerating cycle apparatus for a freezer car, a space to be cooled is an inside of a refrigerator-freezer.

Figure 2:
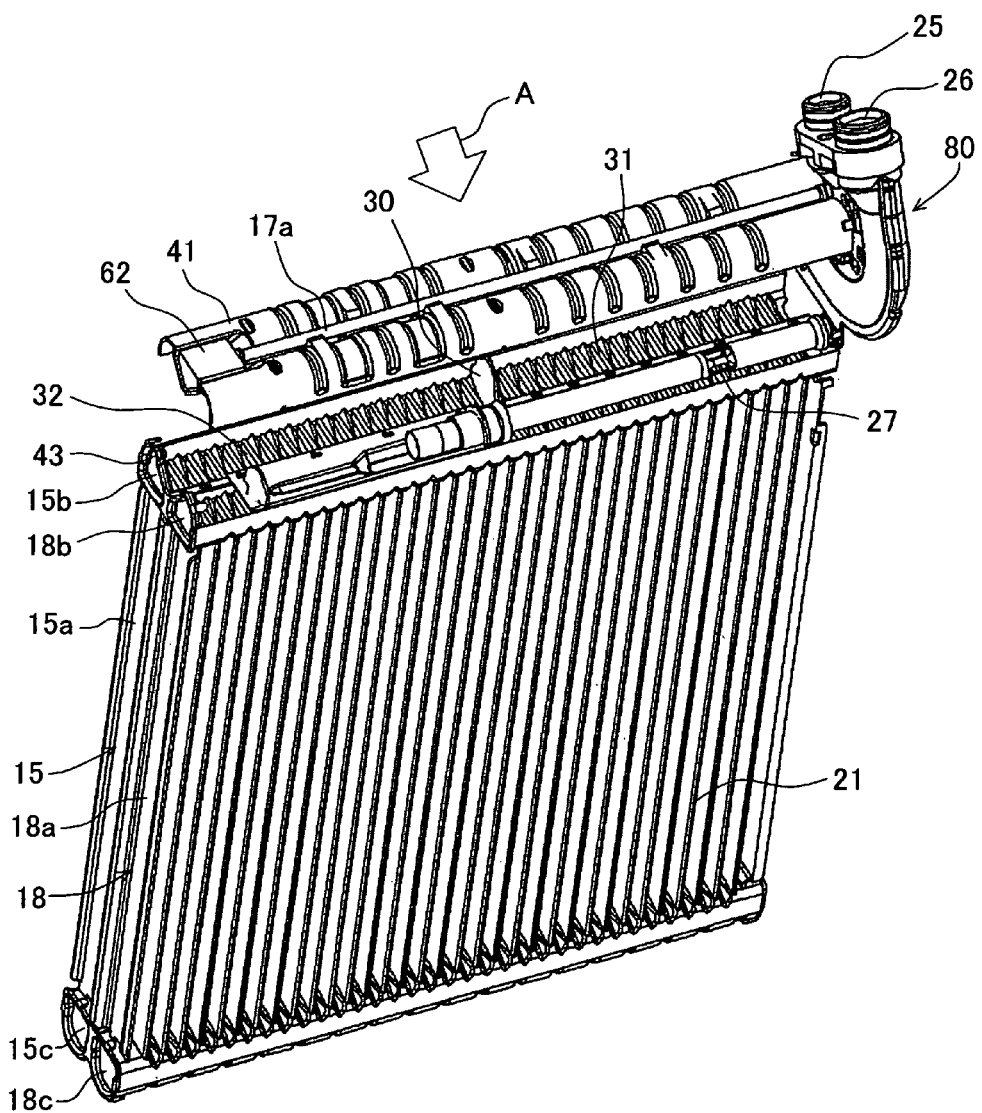
FIG. 2 is an exploded perspective view of an integrated unit of the refrigerating cycle according to the embodiment.
Figure 3:
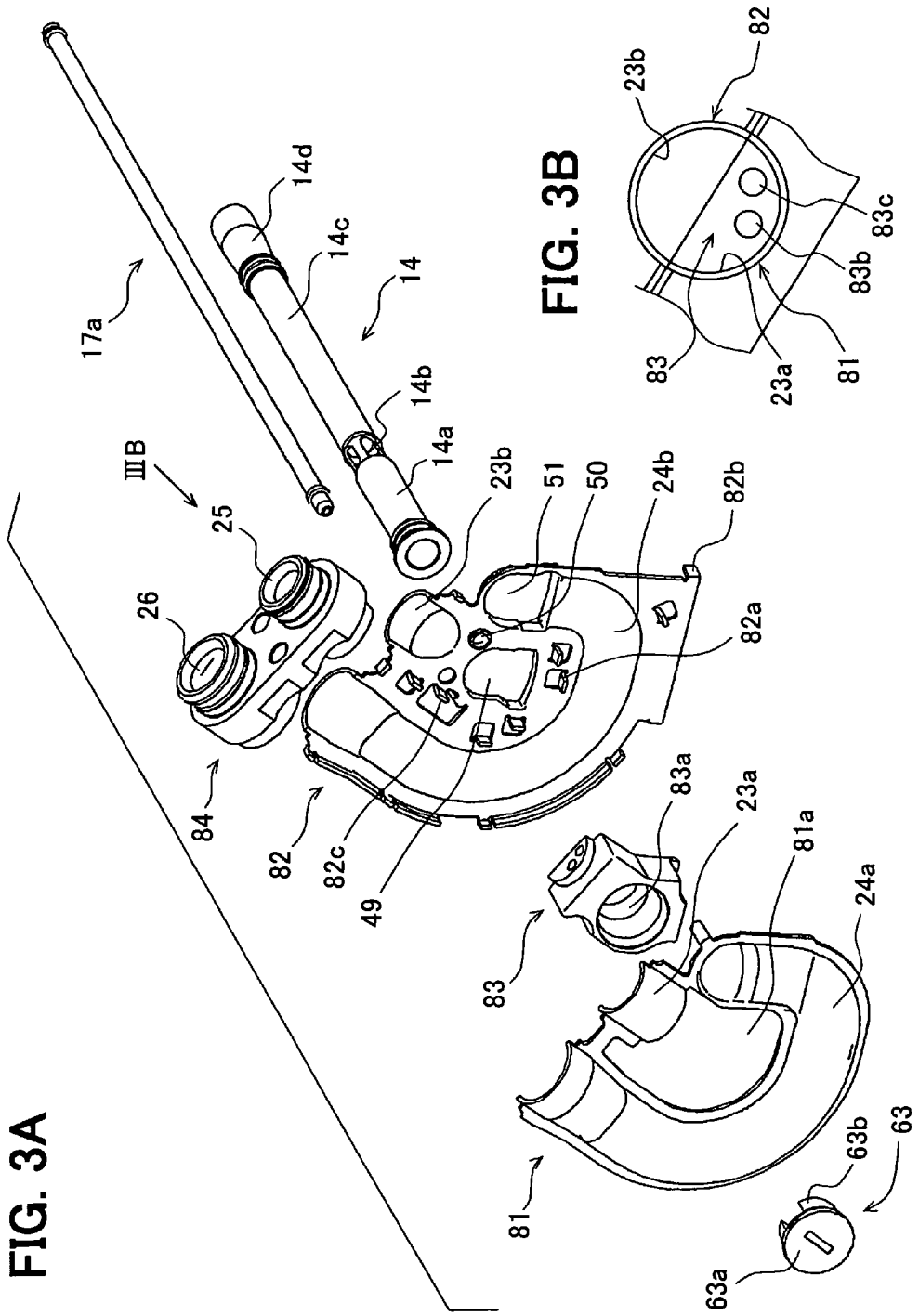
FIG. 3A is an exploded perspective view of some components of the integrated unit according to the embodiment.
FIG. 3B is an end view along an arrow IIIB in FIG. 3A in a condition where the some of components are assembled.
Figure 4:
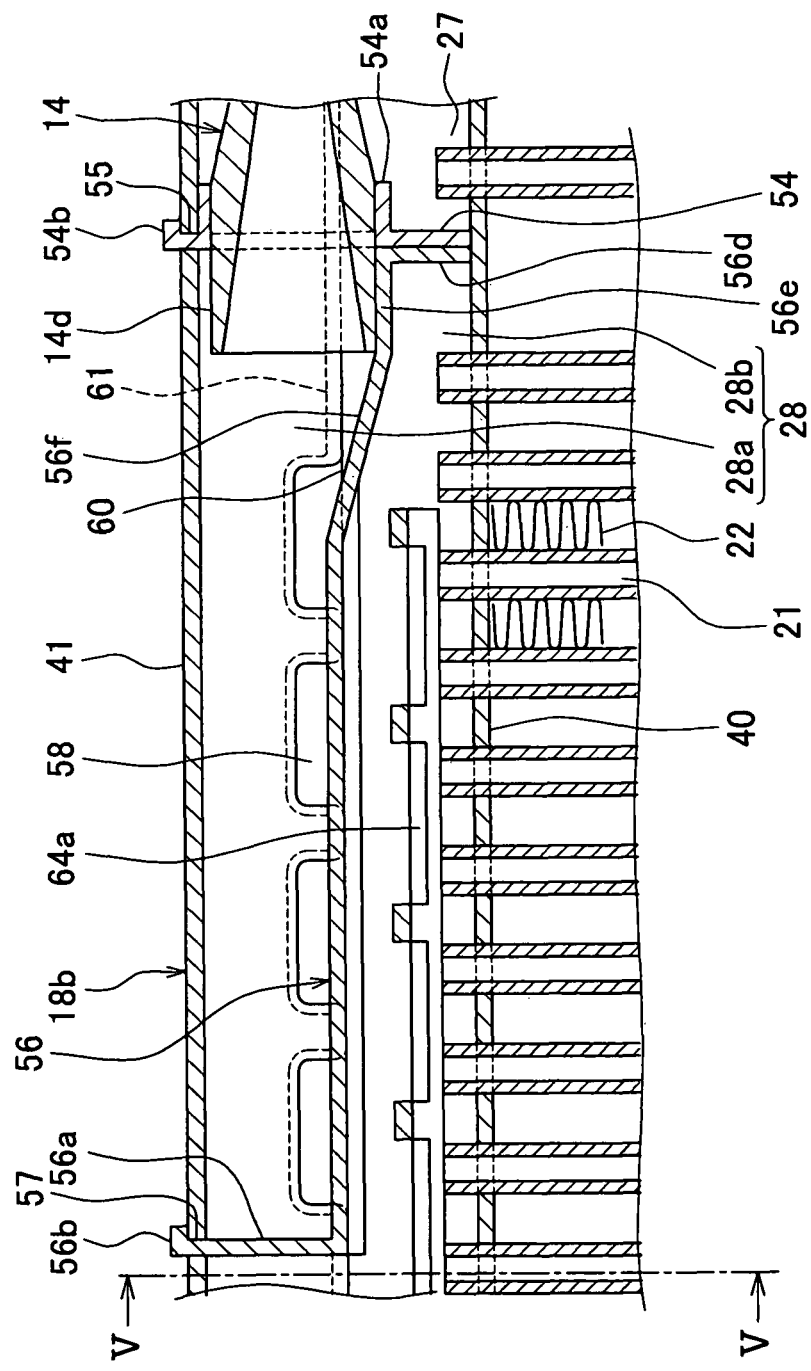
FIG. 4 is an enlarged longitudinal sectional view of a second space of an upper tank 18b of the integrated unit according to the embodiment.
Figure 5:
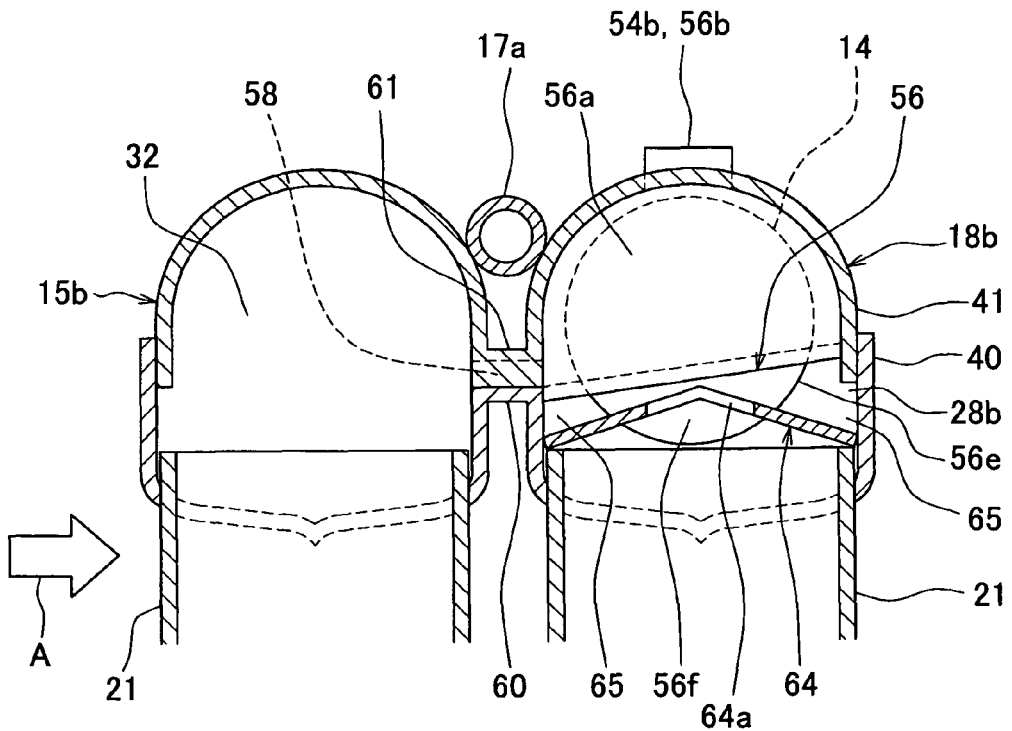
FIG. 5 is a cross-sectional view taken along a line V-V in FIG. 4.

Here, in the present embodiment, the ejector 14, the first and second evaporators 15, 18 and the throttle device 17 are integrated into a single integrated unit 20. Next, a specific structure of the integrated unit 20 will be described with referent to FIGS. 2 to 5. FIG. 2 is an exploded perspective view of the integrated unit 20 according to the present embodiment. FIG. 3A is an exploded perspective view of some components of the integrated unit 20 according to the present embodiment. FIG. 3B is a perspective view in a condition where the some components shown in FIG. 3A are assembled. FIG. 4 is a vertical cross-section of a second space 28 of an upper tank 18b according to the present embodiment. FIG. 5 is a cross-section taken along a line V-V in FIG. 4.

The first and second evaporators 15, 18 are accommodated in a non-illustrated case. The first and second evaporators 15, 18 are integrated into a completely single evaporator structure. The first evaporator 15 constitutes an upstream section of the evaporator structure with respect to an air flow direction A. The second evaporator 18 constitutes a downstream section of the evaporator structure with respect to the air flow direction A.

An electric blower 19 blows air to be cooled into common passages of the first and second evaporators 15, 18 in the air flow direction A. A cooled air, which has been cooled through the first and second evaporator 15, 18, is conducted into a non-illustrated space to be cooled.

The first evaporator 15 and the second evaporator 18 have the same basic structure. The first evaporator 15 and the second evaporator 18 each have a heat exchanging part 15a, 18a, and upper and lower tanks 15b, 15c, 18b, 18c disposed at upper and lower sides of the heat exchanging part 15a, 18a.

Each heat exchanging part 15a, 18a has multiple tubes 21 extending in an up and down direction. Passages for allowing a heat exchanging medium to flow are provided in the tubes 21. In the present embodiment, the passages for allowing the air to be cooled to flow are provided. Fins 22 are disposed between the tubes 21. The fins 22 are joined to the tubes 21. That is, the heat exchanging part 15a, 18a is constructed of a stack of tubes 21 and fins 22.

The tubes 21 and the fins 22 are alternately stacked in a right and left direction of the heat exchanging part 15a, 18a. The stack of tubes 21 and fins 22 is formed over an entire width of the heat exchanging part 15a, 18a. The air blown by the electric blower 19 passes through clearances provided in the stack of tubes 21 and fins 22.

The tube 21 is a flat tube having a major axis of a cross-section in the air flow direction A. The fin 22 is, for example, a corrugate fin formed by bending a thin plate member in a wave form. The fin 22 is joined to a flat outer surface of the tube 21. The fin 22 has a function of increasing a heat transferring area of the air. As another embodiment, the heat exchanging part 15a, 18a can be constructed without having the fins 22.

The tubes 21 of the heat exchanging part 15a and the tubes 21 of the heat exchanging part 18a form refrigerant passages therein, which are separate from each other. The upper and lower tanks 15b, 15c of the first evaporator 15 and the upper and lower tanks 18b, 18c of the second evaporator 18 each have a shape extending in an arrangement direction of the multiple tubes 21. The arrangement direction of the tubes 21 corresponds to a right and left direction in FIG. 2, and is perpendicular to the air flow direction A.

Upper and lower ends of the tubes 21 of the heat exchanging part 15a are inserted in the upper and lower tanks 15b, 15c of the first evaporator 15. The upper and lower tanks 15b, 15c have non-illustrated tube engagement hole portions to which the upper and lower ends of the tubes 21 are joined. The upper and lower ends of the tubes 21 of the heat exchanging part 15a are in communication with inner spaces of the upper and lower tanks 15b, 15c.

Likewise, upper and lower ends of the tubes 21 of the heat exchanging part 18a are inserted in the upper and lower tanks 18b, 18c of the second evaporator 18. The upper and lower tanks 18b, 18c have, non-illustrated tube engagement hole portions to which the upper and lower ends of the tubes 21 are joined. The upper and lower ends of the tubes 21 of the heat exchanging part 18a are in communication with inner spaces of the upper and lower tanks 18a, 18c.

The upper and lower tanks 15b, 15c, 18b, 18c serve to distribute the refrigerant flow into the tubes 21 of the corresponding heat exchanging part 15a, 18a or collect the refrigerant flow from the tubes 21 therein. The upper tanks 15b, 18b are integrally formed with each other. Likewise, the lower tanks 15c, 18c are integrally formed with each other.

In the present embodiment, the two upper tanks 15b, 18b are constructed of a first divisional body 40 and a second divisional body 41, the first divisional body 40 being adjacent to the tubes and extending in a tank longitudinal direction, which corresponds to the tube arrangement direction, the second divisional body 41 being opposite to the tubes with respect to the first divisional body 40 and extending in the tank longitudinal direction. By coupling and joining the first and second divisional bodies 40, 41 to each other, two tubular shapes extending in the tank longitudinal direction are formed in the air flow direction A.

An end of the two tubular shapes of the upper tanks 15b, 18b is covered with a cap 43. In this way, the two upper tanks 15b, 18b are formed. The first divisional body 40 has a W-shaped cross-section for integrally forming semi-tubular shapes of the two upper tanks 15b, 18b on a side adjacent to the tubes 21. On the other hand, the second divisional body 41 has an M-shaped cross-section for integrally forming semi-tubular shapes of the two upper tanks 15b, 18b on the opposite side of the tubes 21 with respect to the first divisional body 40.

Components of the evaporator structure, such as the tubes 21, the fins 22, the upper and lower tanks 15b, 15c, 18b, 18c, are made of a metal material having high heat conductivity and a high brazing property, such as aluminum. In a case where the components are formed by aluminum materials, all the components of the first and second evaporators 15, 18 are integrated by brazing.

In the present embodiment, a passage-forming unit 80 for providing a refrigerant inlet and a refrigerant outlet, and the capillary tube 17a for constituting the throttle device 17 are also integrated with the first and second evaporators 15, 18 by brazing. The capillary tube 17a and the passage-forming unit 80 are made of aluminum materials, similar to the components of the evaporator structure.

With regard to the ejector 14, the nozzle portion 14a is formed with a narrow passage at high accuracy. For example, if the ejector 14 is brazed, the nozzle portion 14a is thermally deformed due to a high brazing temperature, such as approximately 600 degrees Celsius. As such, it is difficult to maintain a passage shape and dimension of the nozzle portion 14a as originally designed.

In the present embodiment, therefore, the ejector 14 is assembled to the second evaporator 18 after the first and second evaporators 15, 18, the passage-forming unit 80 and the capillary tube 17a are integrally brazed.

In the ejector 14, the nozzle portion 14a is made of a material, such as stainless, brass or the like. On the other hand, a housing portion, which forms the refrigerant suction port 14b, the mixing portion 14c, the diffuser portion 14d, other than the nozzle portion 14a, are made of a metal material, such as copper, aluminum, or a nonmetal material, such as a resin.

The ejector 14 is inserted in an inside of the upper tank 18b through a through hole 83a of a distribution block 83 and a hole of a main passage opening portion 49 of an inner plate 82, after a brazing step conduced for integrally brazing the first and second evaporators 15, 18 and the like in an assembling process.

Figure 6:
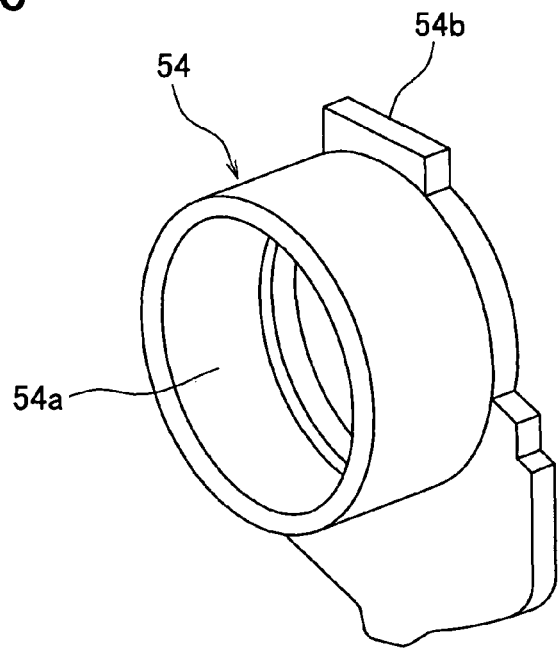
FIG. 6 is a perspective view of an ejector fixing plate of the integrated unit according to the embodiment.

An ejector fixing plate 54 is disposed in the inner space of the upper tank 18b of the second evaporator 18 at a substantially middle portion with respect to the longitudinal direction thereof and brazed with an inner surface of the upper tank 18b. FIG. 6 is a perspective view of the ejector fixing plate 54 according to the present embodiment. The ejector fixing plate 54 has a generally plate-shaped portion and a cylindrical portion 54a integrally formed with the plate-shaped portion.

The diffuser portion 14d of the ejector 14 is engaged with and fixed to an inner periphery of the cylindrical portion 54a. Also, the ejector fixing plate 54 has a function of separating the inner space of the upper tank 18b into a first space 27 and a second space 28 in the longitudinal direction of the upper tank 18b. The first space 27 serves as a collection tank for collecting the refrigerant from the tubes 21. On the other hand, the second space 28 serves as a distribution tank for distributing the refrigerant into the tubes 21.

An engagement portion between the cylindrical portion 54a and the diffuser portion 14d is sealed with a non-illustrated O-ring. A nail portion 54b extending from the ejector fixing plate 54 in an upward direction passes through a slit-like opening portion 55 formed on an upper wall of the upper tank 18b and is crimped to be fixed to the upper tank 18b. As such, the ejector fixing plate 54 has a structure capable of being preliminarily fixed to the upper tank 18b before the brazing.

The ejector 14 has a long, narrow cylindrical shape extending in an axial direction of the nozzle portion 14a. The ejector 14 is disposed parallel to the upper tank 18b such that a longitudinal direction of the cylindrical shape coincides with the longitudinal direction of the upper tank 18b.

A separator 30 is disposed in an inner space of the upper tank 15b of the first evaporator 15 at a substantially middle position with respect to the longitudinal direction thereof. The separator 30 has a function of separating the inner space of the upper tank 15b into a third space 31 and a fourth space 32 with respect to the longitudinal direction of the upper tank 15b. The third space 31 serves as a collection tank for collecting the refrigerant from the tubes 21. On the other hand, the fourth space 32 serves as a distribution tank for distributing the refrigerant into the tubes 21.

The capillary tube 17a is disposed on a valley portion formed in the middle of the M-shaped second divisional body 41. The capillary tube 17a is integrally brazed with outer surfaces of the upper tanks 15b, 18b. An end of the capillary tube 17a, which forms a refrigerant outlet, passes through a through hole of the cap 43 covering the ends of the upper tanks 15b, 18b, and is open to the inside of the second space 28.

The passage-forming unit 80 is integrally brazed with other ends of the upper tanks 15b, 18b of the first and second evaporators 15, 18. The passage-forming unit 80 includes an outer plate 81, the inner plate 82, the distribution block 83, a connection block 84 and a blocking member 63. The passage-forming unit 80 can be understood as a distribution part disposed upstream of a heat exchanging section with respect to the refrigerant flow for distributing the refrigerant introduced therein into multiple refrigerant passages. Also, the passage-forming unit 80 can be understood as a passage section.

The outer plate 81 and the inner plate 82 are each formed by pressing a plate shape aluminum member. An inflow passage 23 and an outflow passage 24 are formed by coupling these plates 81, 82 to each other.

In the present embodiment, the outer plate 81 has a hole portion 81a at a center thereof for receiving the distribution block 83 therein. The outer plate 81 is formed with groove portions 23a, 24a each having a semicircular cross-section. The groove portion 23a is formed to provide a passage that extends in a direction perpendicular to the longitudinal direction of the upper tank 18b and toward the hole portion 81a. Both ends of the passage provided by the groove portion 23a are open in a flow direction without having passage walls.

The groove portion 24a is provided to extend in a substantially G-shape to surround the hole portion 81a. An end of a passage provided by the groove portion 24a is surrounded by a passage wall, and a space provided by the end of the passage has a shape corresponding to a quarter of a sphere. On the other hand, the other end of the passage provided by the groove portion 24a is open in a flow direction of the passage without having a passage wall. Also, at the other end of the passage, a cross-sectional area increases once toward its open end and remains constant at the vicinity of the open end.

The main passage opening portion 49 is formed at the center of the inner plate 82. The main passage opening portion 49 has the same shape as a cross-section of the inner space of the upper tank 18b. Further, the inner plate 82 has a refrigerant outlet opening portion 51 adjacent to the main passage opening portion 49. The refrigerant outlet opening portion 51 has the same shape as the main passage opening portion 49. The inner plate 82 has a branch passage opening portion 50 between the main passage opening portion 49 and the refrigerant outlet opening portion 51. The capillary tube 17a is inserted to the branch passage opening portion 50.

The inner plate 82 has groove portions 23b, 24b each providing a passage having a semicircular cross-section. The groove portion 23b forms the passage from an outer peripheral side toward the main passage opening portion 49. An end of the passage provided by the groove portion 23b is open toward the outer peripheral side without having a passage wall. On the other hand, the other end of the passage provided by the groove portion 23b, which is on an inner peripheral side, is surrounded by a passage wall. A space provided by the other end of the groove portion 23b has a shape corresponding to a half of a cone.

The groove portion 24b is formed to extend in a substantially G-shape to surround the main passage opening portion 49. An end of the passage provided by the groove portion 24b is open toward the refrigerant outlet opening portion 51 without having a passage wall. On the other hand, the other end of the passage provided by the groove portion 24b is open with respect to a flow direction of the passage without having a passage wall. Also, at the other end, a cross-sectional area of the passage increases once toward the open end and then remains constant at the vicinity of the open end. The end of the passage of the groove portion 24b has a pointed bottom and the other end of the passage of the groove portion 24b has a flat bottom.

The inner plate 82 has nail portions 82a, 82b, 82c. The inner plate 82 has eight nail portions 82a. The nail portions 82a have a function of preliminarily fixing the outer plate 81 and the inner plate 82. The nail portions 82a are formed on peripheries of the groove portions 23b, 24b. By the nail portions 82a, the inner plate 82 and the outer plate 81 can be preliminarily fixed to each other before the brazing.

The inner plate 82 has two nail portions 82b. The nail portions 82b has a function of preliminarily fixing the inner plate 82 to the heat exchanging parts 15a, 18a. The inner plate 82 has three nail portions 82c. The nail portions 82c have a function of preliminarily fixing the inner plate 82 to the distribution block 83.

The nail portions 82c are located on a periphery of the main passage opening portion 49 so as to fix the distribution block 83 in three directions. By the nail portions 82c, the inner plate 82 and the distribution block 83 can be preliminarily fixed before the brazing.

The inflow passage 23 is formed by coupling the groove portions 23a, 23b. The inflow passage 23 can also be understood as a supply passage for supplying the refrigerant into openings 83b, 83c formed on the distribution block 83. Also, the outflow passage 24 is formed by coupling the groove portions 24a, 24b.

Figure 7:
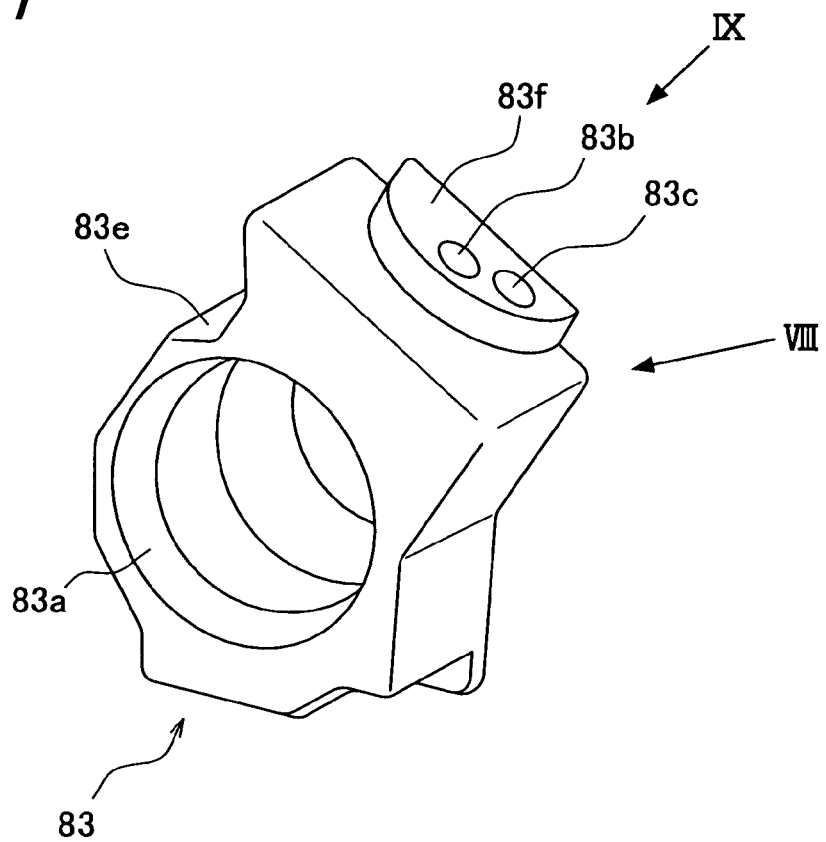
FIG. 7 is a perspective view of a distribution block of the integrated unit according to the embodiment.
Figure 8:
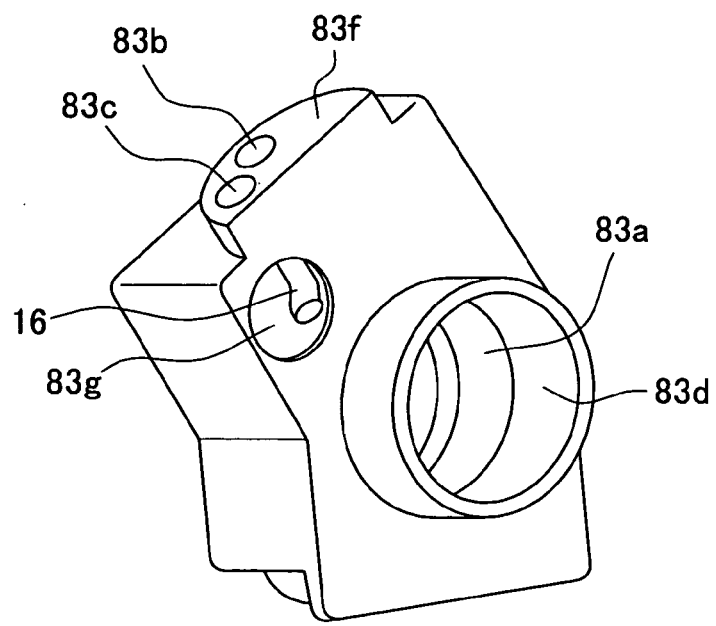
FIG. 8 is a perspective view of the distribution block when viewed along an arrow VIII in FIG. 7.
Figure 9:
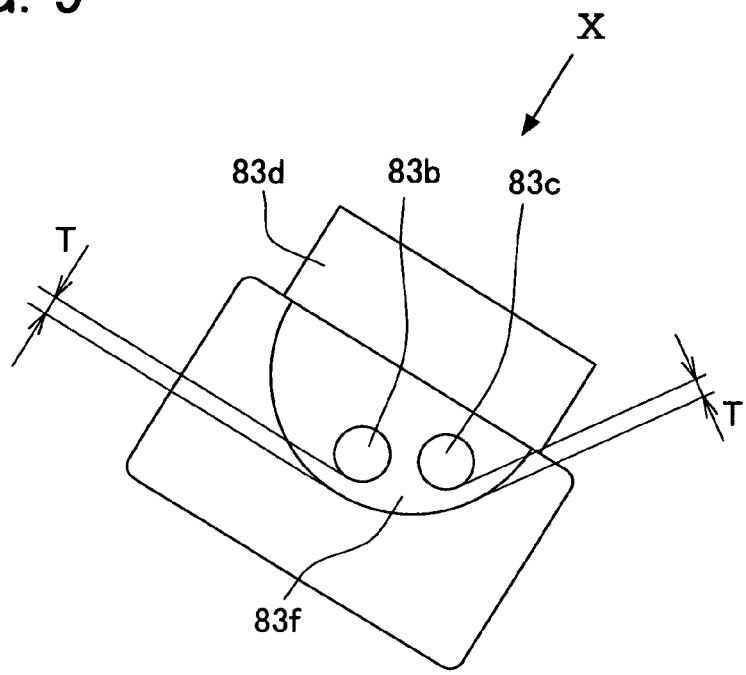
FIG. 9 is a side view of the distribution block when viewed along an arrow IX in FIG. 7.
Figure 10:
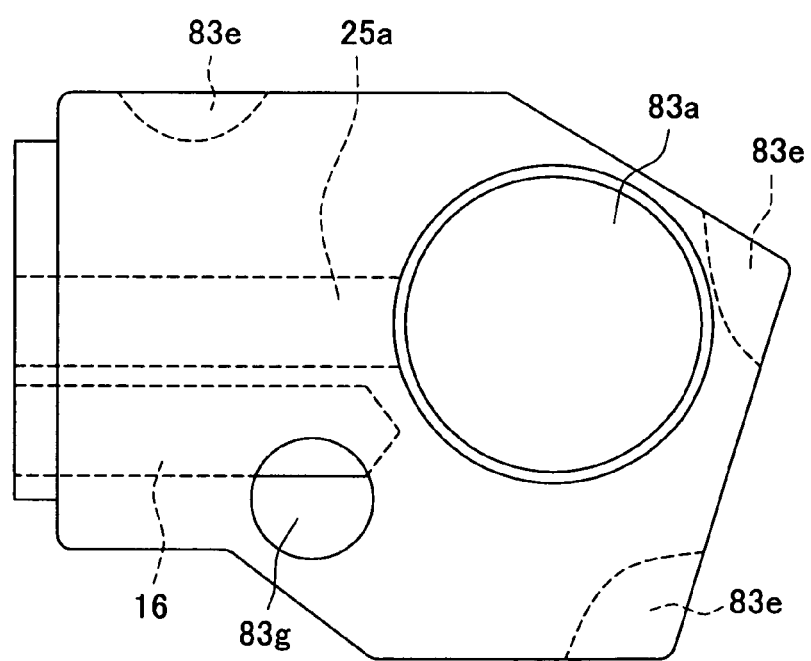
FIG. 10 is a side view of the distribution block when viewed along an arrow X in FIG. 9.

A structure of the distribution block 83 will be described with reference to FIGS. 7 to 10. FIG. 7 is a perspective view of the distribution block 83 according to the present embodiment. FIG. 8 is a perspective view of the distribution block 83 when viewed along an arrow VIII in FIG. 7. FIG. 9 is a perspective view of the distribution block 83 when viewed along an arrow IX in FIG. 7. FIG. 10 is a perspective view of the distribution block 83 when viewed along an arrow X in FIG. 9.

The distribution block 83 has a body with a rectangular parallelepiped shape whose a middle portion is slightly bent. The through hole 83a is formed at a center of the body of the distribution lock 83 as an insertion passage for allowing the ejector 14 to pass through. The through hole 83a has a diameter so that the ejector 14 can be inserted therein.

The distribution block 83 has a cylindrical portion 83d having a cylindrical shape that projects parallel to an insertion direction of the ejector 14. A projection height of the cylindrical portion 83d is substantially half of a thickness of the body of the distribution block 83. The through hole 83d is formed also inside of the cylindrical portion 83d. A circular cross-section of the through hole 83a within the cylindrical portion 83d is slightly smaller than a circular cross-section of the through hole 83a within the body of the distribution block 83.

The distribution block 83 has a projected portion 83f with a semicircular shape on its one side. A projection end surface of the projected portion 83f has a shape same as a cross-sectional shape of the passage provided by the groove portion 23a of the outer plate 81. In the present embodiment, the shape of the projection end surface of the projected portion 83f is a semicircular shape. As such, materials costs can be reduced.

The projected portion 83f is formed such that a chord of the semicircular shape of the projection end surface is perpendicular to an axis of the through hole 83a. The projection end surface of the projected portion 83f can be understood as a distribution surface defining an end of the inflow passage 23.

Further, the projection end surface of the projected portion 83f is formed with the main opening portion 83b of a main passage 25a that penetrates perpendicularly from the projection end surface to the through hole 83a. The main passage 25a provides a passage having a circular cross-section. The main passage 25a has an axis passing through a center of the circular cross-section of the through hole 83a. The main passage 25a can be understood as a first passage for supplying the refrigerant to the heat exchanging part 15a. The main opening portion 83b can be understood as a first opening portion. The main opening portion 83b has a circular shape. The main opening portion 83b is formed such that a center thereof is located on a radius that is perpendicular to the chord of the semicircular projection end surface of the projected portion 83f.

The projection end surface of the projected portion 83f is formed with a branch opening portion 83c of the branch passage 16 that penetrates perpendicularly from the projection end surface to an insertion hole 83g. The branch passage 16 provides a passage with a circular cross-section. The branch passage 16 has an axis parallel to the axis of the main passage 25a. The branch passage 16 can be understood as a second passage for supplying the refrigerant to the heat exchanging part 18a, and the branch opening portion 83c can be understood as a second opening portion.

The branch opening portion 83c has a circular shape. A minimum distance between an opening edge of the branch opening portion 83c and a projection edge of the projection end surface is equal to a minimum distance between an opening edge of the main opening portion 83b and the projection edge of the projection end surface. These minimum distances are defined as distances T, as shown in FIG. 9. The projection end surface, the main opening portion 83b, the branch opening portion 83c of the projected portion 83f are disposed perpendicular to the axis of the inflow passage 23. Also, the main passage 25a and the branch passage 16 are formed parallel to a flow direction of the refrigerant of the inflow passage 23. The branch passage 16 is in communication with the insertion hole 83g.

The insertion hole 83g is formed to allow the capillary tube 7a to be inserted therein. The insertion hole 83g has a depth substantially two third of a thickness of the body of the distribution block 83, and thus does not penetrate through the body of the distribution block 83. The insertion hole 83g has an axis parallel to the axis of the through hole 83a. An arrangement relationship between the insertion hole 83g and the through hole 83a is the same as an arrangement relationship between the main passage opening portion 49 and the branch passage opening portion 50 of the inner plate 82.

The distribution block 83 has three engagement portions 83e. The engagement portions 83e are formed at locations corresponding to the nail portions 82c. The nail portions 82c are bent over the engagement portions 83e, and thus the engagement portions 83e has a function of connecting the distribution block 83 and the inner plate 82.

The connection block 84 is provided with the refrigerant inlet 25 and the refrigerant outlet 26. The refrigerant outlet 26 has a diameter greater than a diameter of the refrigerant inlet 25. The refrigerant inlet 25 is disposed to cover the one open end of the inflow passage 23, which is opposite to the other open end to which the projection end surface of the projected portion 83f of the distribution block 83 is arranged. The refrigerant outlet 26 is disposed to cover the one open end of the outflow passage 24, which is opposite to the other open end of the outflow passage 24 defining the refrigerant outlet opening portion 51.

The blocking member 63 serves to block the through hole 83a of the distribution block 83 after the ejector 14 is inserted to the inside of the upper tank 18b through the through hole 83a. Further, the blocking member 63 has a function of fixing the ejector 14 with respect to the longitudinal direction by bringing projecting pieces 63b thereof into contact with the inlet side end of the ejector 14 with respect to the longitudinal direction.

The blocking member 63 has a base portion 63a with a disc shape and two projecting pieces 63b extending perpendicularly from the base portion 63a. The base portion 63a and the projecting pieces 63b are integrally formed with each other. The projecting pieces 63b extend in the longitudinal direction of the ejector 14. The projecting pieces 63b each have a semicircular shape in cross section defined perpendicular to an extending direction thereof. The projecting pieces 63b are formed such that a chord of the semicircular shape of each projecting piece 63b is parallel to the axis of the main passage 25a.

Figure 11:
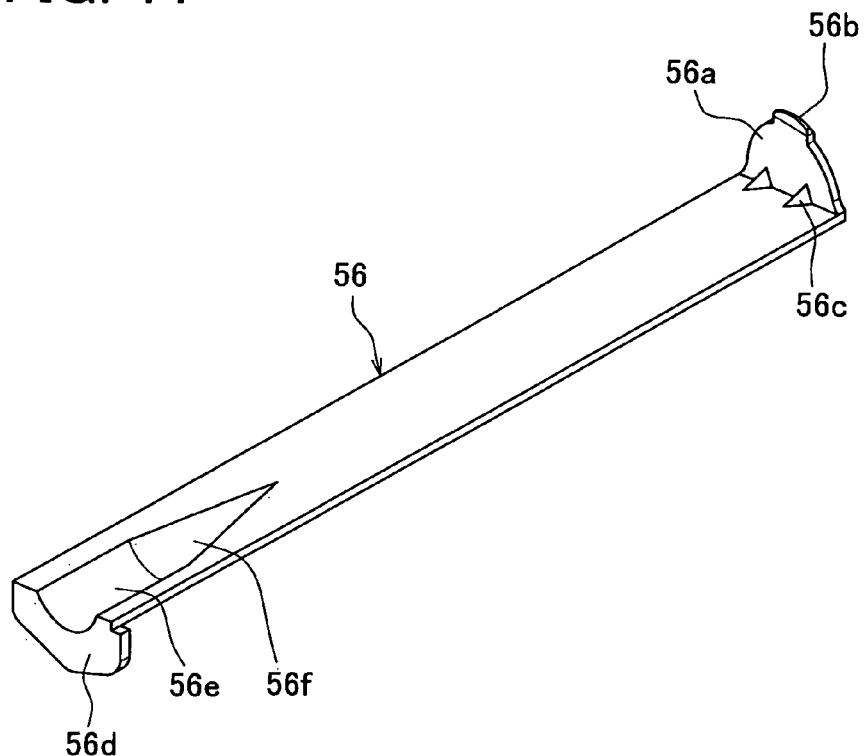
FIG. 11 is a perspective view of a separation plate of the integrated unit according to the embodiment.

A separation plate 56 is disposed in the second space 28 of the upper tank 18b at a middle position with respect to an up and down direction. FIG. 11 is a perspective view of the separation plate 56 according to the present embodiment. The separation plate 56 is a plate member extending in the longitudinal direction of the upper tank 18b, and is brazed with the inner surface of the upper tank 18b.

The second space 28 of the upper tank 18b is further separated into two spaces, that is, an upper space 28a and a lower space 28b, in the up and down direction by the separation plate 56. The separation plate 56 has a bent portion 56a bent perpendicularly and upwardly, at an end thereof. Further, the separation plate 56 has a nail portion 56b that projects upwardly from an end of the bent portion 56a.

The nail portion 56a is crimped through a slit-like hole portion 57 of the upper wall of the upper tank 18b to be fixed to the upper tank 18b. As such, the separation plate 56 can be preliminarily fixed to the upper tank 18b before the brazing. Also, the outlet end of the capillary tube 17a is in communication with the lower space 28b of the second space 28 by providing a predetermined clearance between the bent portion 56a of the separation plate 56 and the outlet end of the capillary tube 17a.

The separation plate 56 has ribs 56c on an inner side of the bent of the bent portion 56a. The ribs 56c are formed by embossing, and project in a triangular shape. The ribs 56c ensure stiffness at the bent portion 56a of the separation plate 56 so as to restrict a change in a bent angle.

The separation plate 56 has a bent portion 56d bent perpendicularly and downwardly, at an end adjacent to the ejector fixing plate 54. The bent portion 56d is in contact with and brazed with the ejector fixing plate 54 and the first divisional member 40 of the upper tank 18b.

Here, the outlet of the diffuser portion 14d is disposed to pass through the cylindrical portion 54a of the ejector fixing plate 54. The outlet of the diffuser portion 14d projects into the upper space 28a of the second space 28 of the upper tank 18b. The outlet of the diffuser portion 14d is directly in communication with the inside of the upper space 28a.

The separation plate 56 is formed with a groove portion 56e recessed downwardly adjacent to the bent portion 56d. A lower side of the outlet of the diffuser portion 14d of the ejector 14 is fitted on the groove portion 56e. A guide portion 56f is formed on the separation plate 56 to extend from the groove portion 56e. The guide portion 56f has an arcuate shape and is tilted so as to smoothly guide the refrigerant flowing out from the outlet of the diffuser portion 14d.

The upper space 28a of the upper tank 18b is in communication with the fourth space 32 of the upper tank 15b of the first evaporator 15 through communication hole portions 58. The communication hole portions 58 are formed at plural locations in the tank longitudinal direction. In the present embodiment, four communication hole portions 58 are formed.

The communication hole portions 58 are formed at a connecting portion between the upper tank 15b and the upper tank 18b. Specifically, a flat wall 60 provided at a middle of the W-shaped first divisional member 40 and a flat wall 61 provided at a middle of the M-shaped second divisional member 41 are joined to each other by brazing. Here, recessed portions, which are recessed upwardly, are formed on the flat wall 61 of the divisional member 41, so that the communication hole portions 58 are provided by spaces surrounded by the recessed portions and the flat wall 60 of the divisional member 40.

Figure 12:
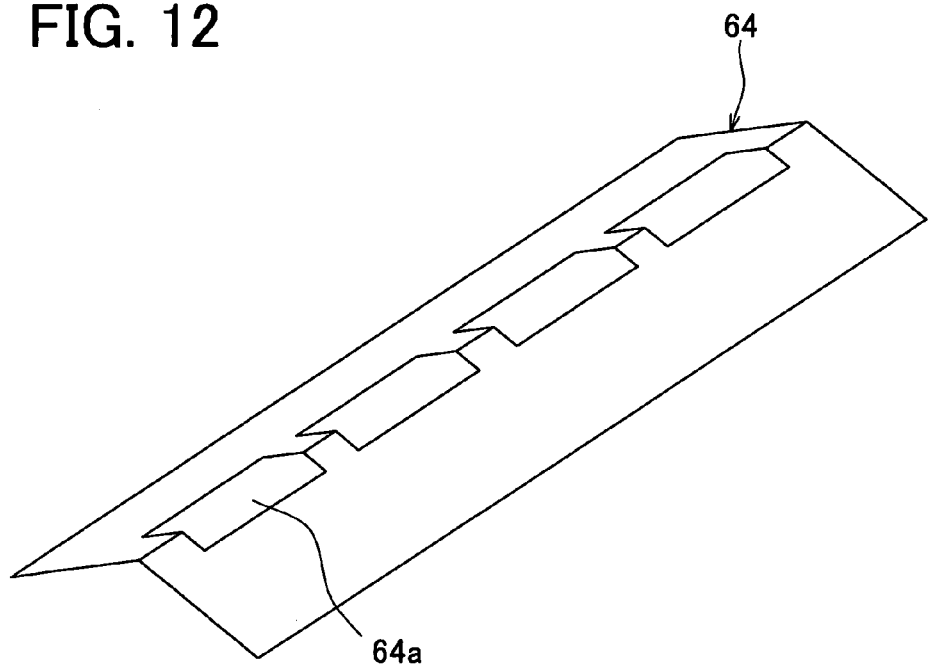
FIG. 12 is a perspective view of a refrigerant retaining plate of the integrated unit according to the embodiment.

A refrigerant retaining plate 64 is disposed in the lower space 28b of the upper tank 18b at a middle portion with respect to an up and down direction. FIG. 12 is a perspective view of the refrigerant retaining plate 64 according to the present embodiment. The refrigerant retaining plate 64 is a member brazed with the inner surface of the upper tank 18b.

The refrigerant retaining plate 64 is a plate-like member extending in the longitudinal direction of the upper tank 18b and having a mountain-like cross-section. Hole portions 64a are formed at the top of the mountain-shaped refrigerant retaining plate 64 at plural locations with respect to the longitudinal direction of the upper tank 18b. Each of the hole portions 64 is formed by punching and has a rectangular shape.

The lower space 28b provides a distribution-side tank space therein for distributing the refrigerant into upper openings of the tubes 21. The refrigerant retaining plate 64 retains the liquid-phase refrigerant of the gas and liquid two-phase refrigerant from the capillary tube 17a on valley portions 65 formed on both sides of the mountain-shape thereof. The retained liquid-phase refrigerant falls down through the rectangular hole portions 64a and is evenly distributed to the upper openings of the tubes 21.

Next, an entire structure of a refrigerant passage of the integrated unit 20 will be described in detail. First, the refrigerant flows in the refrigerant inlet 25 of the connection block 84, and passes through the inflow passage 23. The refrigerant passing through the inflow passage 23 is in a condition of gas and liquid two-phase annular flow. In the inflow passage 23, the gas and liquid two-phase refrigerant is guided by the groove portions 23a, 23b and conducted to the projection end surface of the projected portion 83f of the distribution block 83.

A vapor-condition two-phase refrigerant of the refrigerant flowing toward the projected end surface flows a center of the inflow passage 23. On the other hand, the liquid-phase refrigerant flows along the inner surface of the inflow passage 23 while forming a liquid film on the inner surface of the inflow passage 23. The liquid film formed by the liquid-phase refrigerant varies in accordance with an operation load of the refrigerating cycle 10. Also, the total flow rate of the refrigerant flowing through the inflow passage 23 varies in accordance with the operation load of the refrigerating cycle.

The refrigerant having such variable factors flows in the main opening portion 83b and the branch opening portion 83c formed on the projection end surface of the projected portion 83f. In the present embodiment, a distribution ratio of the refrigerant flowing in the main opening portion 83b and the refrigerant flowing in the branch opening portion 83c is constant irrespective of the operation load of the refrigerating cycle 10. The refrigerants entering these opening portions pass through the main passage 25a and the branch passage 16.

The refrigerant passing through the main passage 25a flows into the through hole 83a. The refrigerant then passes through the inside of the cylindrical portion 83d, which is in communication with the through hole 83a, and further passes through the nozzle portion 14a, the mixing portion 14c, the diffuser portion 14d of the ejector 14 to be decompressed. A low pressure refrigerant, which has been decompressed, flows into the upper space 28a of the upper tank 18b of the second evaporator 18, which is located on a downstream side with respect to the air flow.

The refrigerant flowing in the upper space 28a enters the fourth space 32 of the upper tank 15b of the first evaporator 15, which is located on an upstream side with respect to the air flow, through the multiple communication hole portions 58. The refrigerant in the fourth space 32 is distributed into the tubes 21 of a right section of the air-upstream-side heat exchanging part 15a. The refrigerant flows downwardly in the tubes 21, and enters a left section of the lower tank 15c. Because the lower tank 15c is not provided with a separator, the refrigerant moves from the left section to a right section in the lower tank 15c.

The refrigerant in the right section of the lower tank 15c flows in the tubes 21 of the right section of the air-upstream-side heat exchanging portion 15a upwardly and enters the third space 31 of the upper tank 15b. The refrigerant flows from the third space 31 to the outflow passage 24 through the refrigerant outlet opening portion 51. The refrigerant passing through the outflow passage 24 flows out from the refrigerant outlet 26 of the connection block 84.

On the other hand, the refrigerant passing through the branch passage 16 of the distribution block 83 flows into the insertion hole 83g. The refrigerant flows from the insertion hole 83g to the capillary tube 17a to be decompressed. A low pressure refrigerant, which has been decompressed, is in a gas and liquid two-phase condition. The low pressure refrigerant flows in the lower space 28b of the second space 28 of the upper tank 18b of the second evaporator 18.

A liquid-phase refrigerant of the refrigerant in the lower space 28b retains on the valley portions 65, which are provided on right and left sides of the mountain-like shape of the refrigerant retaining plate 64. The liquid-phase refrigerant retaining on the valley portions 65 overflows through the rectangular hole portions 64a, which are provided adjacent to the top of the mountain-like shape of the refrigerant retaining plate 64, and falls downwardly.

The gas and liquid two-phase refrigerant containing the liquid-phase refrigerant falling through the rectangular hole portions 64a flows downwardly in the tubes 21 of a left section of the downstream-side heat exchanging part 18a and enters a left section of the lower tank 18c. Because the lower tank 18c is not provided with a separator, the refrigerant moves from the left section to a right section in the lower tank 18c.

The refrigerant in the right section of the lower tank 18c flows in the tubes 21 of a right section of the downstream-side heat exchanging part 18a upwardly and enters the first space 27 of the upper tank 18b. Because the first space 27 is in communication with the refrigerant suction port 14b of the ejector 14, the refrigerant in the first space 27 is suctioned into the ejector 14 through the refrigerant suction port 14b.

Since the integrated unit 20 has the above described refrigerant passage structure, only one refrigerant inlet 25 and only one refrigerant outlet 26 are provided in the connection block 84 for the entirety of the integrated unit 20.

Next, an operation of the ejector-type refrigerating cycle 10 according to the present embodiment will be described. As the compressor 11 is driven by a vehicle engine, a high temperature, high pressure refrigerant, which has been compressed in and discharged from the compressor 11, flows in the radiator 12. In the radiator 12, the high temperature refrigerant is condensed as being cooled by the outside air.

The high pressure refrigerant flowing out from the radiator 12 enters the liquid receiver 12a. In the liquid receiver 12a, the refrigerant is separated into the gas-phase and the liquid-phase. The liquid-phase refrigerant is discharged from the liquid receiver 12a and introduced in the thermal expansion valve 13.

In the thermal expansion valve 13, the valve opening degree is adjusted to decompress the high pressure refrigerant such that the refrigerant at the outlet of the first evaporator 15 has a predetermined superheat degree. The refrigerant having passed through the thermal expansion valve 13 is in an intermediate pressure refrigerant. The intermediate pressure refrigerant flows in the refrigerant inlet 25 of the connection block 84, which is the only inlet of the integrated unit 20.

Here, the refrigerant flow is divided into a refrigerant flow directing from the main passage 25a of the distribution block 83 to the ejector 14 and a refrigerant flow directing from the branch passage 16 of the distribution block 83 to the capillary tube 17a. The refrigerant flow entering the ejector 14 is decompressed and expanded in the nozzle portion 14a. Thus, pressure energy of the refrigerant is changed into velocity energy in the nozzle portion 14a, so the refrigerant is ejected from the jet port of the nozzle portion 14a at a high velocity. In accordance with this decrease in pressure of the refrigerant, the gas-phase refrigerant, which has passed through the second evaporator 18, is suctioned into the refrigerant suction port 14b from the branch passage 16.

The refrigerant ejected from the nozzle portion 14a and the refrigerant suctioned into the refrigerant suction port 14b are mixed with each other in the mixing portion 14c, which is provided downstream of the nozzle portion 14a, and is then introduced into the diffuser portion 14d. In the diffuser portion 14d, the velocity energy of the refrigerant is changed into pressure energy due to an increase in the passage area, so the refrigerant pressure increases.

The refrigerant flows out from the diffuser portion 14d of the ejector 14 and enters the heat exchanging part 15a of the first evaporator 15 to be evaporated by absorbing heat of the air flowing in the air flow direction A. The gas-phase refrigerant, which has been evaporated, is suctioned into the compressor 11 through the only refrigerant outlet 26 to be compressed again.

On the other hand, the refrigerant passing through the branch passage 16 enters the capillary tube 17a to be decompressed into a low pressure refrigerant. The low pressure refrigerant is evaporated in the heat exchanging part 18a of the second evaporator 18 by absorbing heat from the air having passed through the first evaporator 15. The gas-phase refrigerant, which has been evaporated, is suctioned into the ejector 14 through the refrigerant suction port 14b.

In the present embodiment, the liquid-phase refrigerant of the gas and liquid two-phase refrigerant passing through the inflow passage 23 flows along the inner surface of the inflow passage 23, and the vapor-condition two-phase refrigerant flows through the center of the inflow passage 23. As a result, the liquid-phase refrigerant forms the liquid film on the inner surface of the inflow passage 23. The thickness of the liquid film varies if the flow rate of the refrigerant varies in accordance with the operation load of the heat exchanger.

The refrigerant distribution ratio at the distribution block 83 affects the ejector 14 and the capillary tube 17a, which are coupled to the downstream positions of the opening portions 83b, 83c, respectively. Also, a change in the liquid-phase refrigerant flowing into each opening portion 83b, 83c more affects than a change in an inflow rate of the gas-phase refrigerant flowing into each opening portion 83b, 83c. The opening portions 83b, 83c are formed to have the same minimum distance T to the inner surface of the inflow passage 23. Therefore, the distribution ratio of the liquid-phase refrigerant distributed into the opening portions 83b, 83c is easily stabilized. Further, since the opening portions 83b, 83c have the same shape, the liquid-phase refrigerant can be distributed into the opening portions 83b, 83c at a constant distribution ratio.

Further, since the opening portions 83b, 83c have the circular shape, the inflow rates of the liquid-phase refrigerant gradually increases or decreases in accordance with the change in the operation load of the heat exchanger. Therefore, the heat exchanger exhibiting a further stable performance can be provided.

In the present embodiment, the refrigerant downstream of the diffuser portion 14d of the ejector 14 can be introduced into the first evaporator 15, as well as the refrigerant in the branch passage 16 can be introduced into the second evaporator 18 through the capillary tube 17a. Therefore, the first and second evaporators 15, 18 can exhibit cooling performance simultaneously. As such, the cooled air, which has been cooled through the first and second evaporators 15, 18, can be blown into the space to be cooled to perform a cooling operation of the space.

Also, a refrigerant evaporation pressure in the first evaporator 15 is a pressure after increased in the diffuser portion 14d. On the other hand, the outlet of the second evaporator 18 is connected to the refrigerant suction port 14d of the ejector 14. As such, the lowest pressure immediately after the decompression by the nozzle portion 14a can be applied to the second evaporator 18.

With this, a refrigerant evaporation pressure in the second evaporator 18 can be lower than the refrigerant evaporation pressure of the first evaporator 15. That is, the first evaporator 15 whose refrigerant evaporation temperature is high can be disposed on the upstream side and the second evaporator 18 whose refrigerant evaporation temperature is low can be disposed on the downstream side, with respect to the air flow direction A.

As a result, a difference between the refrigerant evaporation temperature and the air temperature in the first evaporator 15 and a difference between the refrigerant evaporation temperature and the air temperature in the second evaporator 18 can be ensured. Therefore, cooling performances of the first and second evaporators 15, 18 can be effectively exhibited. Accordingly, the cooling performance for cooling the common space to be cooled can be effectively improved by the combination of the first and second evaporators 15, 18. Further, the driving power for the compressor 11 can be reduced by increasing the suction pressure of the compressor 11 by means of the pressure increase effect in the diffuser portion 14d.

Moreover, since the ejector 14 is inserted in the inside of the upper tank 18b, the inside space of the evaporator tank can be effectively used for mounting the ejector 14. As a result, the integrated unit 20 including the ejector 14 and the evaporators 15, 18 can be mounted in a reduced space.

The ejector 14 is inserted in the upper tank 18b after the first evaporator 15 and the second evaporator 18 are integrated by brazing. As a result, problems, such as a deterioration of dimensional accuracy of the ejector nozzle portion 14a due to a thermal deformation by a high temperature during the brazing and the like can be reduced.

Further, the ejector 14 is inserted in the first space 27 of the air-downstream-side second evaporator 18, which is located at the outlet with respect to the refrigerant flow and collects the refrigerant therein. As a result, since the refrigerant suction port 14b of the ejector 14 is directly in communication with the first space 27, the refrigerant evaporated in the air-downstream-side second evaporator 18 can be directly suctioned into the refrigerant suction port 14b.

In this case, because a pipe and the like for providing a refrigerant suction passage to the refrigerant suction port 14b are not required, the refrigerant passage structure can be simplified. Also, the cooling performance of the air-downstream-side second evaporator 18 can be improved by reducing pressure loss of the refrigerant suction flow.

In a case where a fixing direction of the thermal expansion valve 13 is parallel to the longitudinal direction of the ejector 14, the ejector 14 is opposed to a transmission direction of vibrations of the thermal expansion valve 13. Thus, the vibration of the thermal expansion valve 13 is easily transmitted to the ejector 14. In the present embodiment, on the other hand, the fixing direction of the thermal expansion valve 13 is perpendicular to the longitudinal direction of the ejector 14. That is, the ejector 14 is arranged without opposing to the transmission direction of the vibration from the thermal expansion valve 13. As a result, the vibration of the thermal expansion valve 13 will not be easily transmitted to the ejector 14.

(Other Embodiments)

In the above embodiment, the projection end surface of the projected portion 83f has the semicircular shape. However, the shape of the projection end surface of the projected portion is not limited to the semicircle, but can be a circle.

In the above embodiment, the main opening portion 83b and the branch opening portion 83c are formed to define circular openings on the projection end surface of the projected portion 83f. The opening portions have the same diameter. Alternatively, the main opening portion 83b and the branch opening portion 83c can be modified as long as these have the geometrically similar shape.

Figure 13:
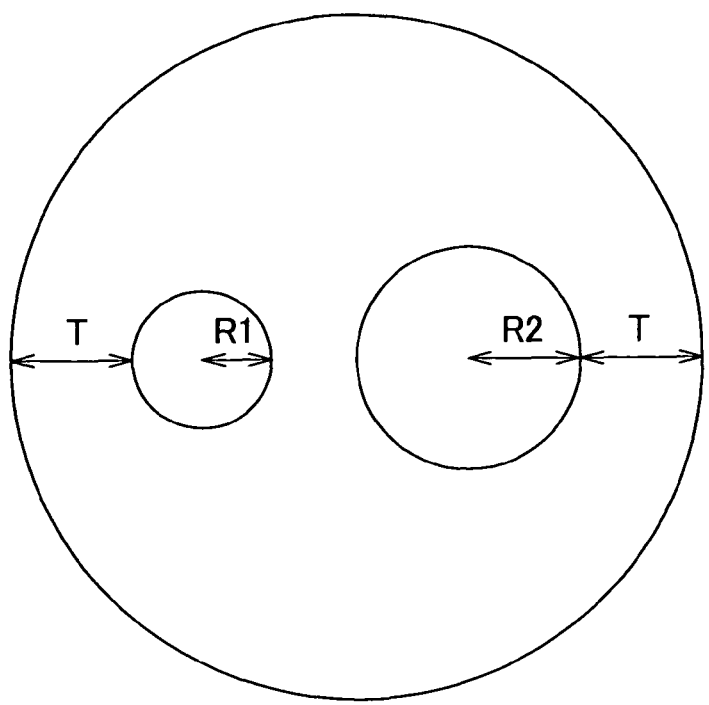
FIG. 13 is an enlarged view illustrating a projection end surface of a projected portion of a distribution block according to another embodiment of the present invention.

For example, the projected portion 83f has a projection end surface as shown in FIG. 13. FIG. 13 shows an enlarged view of a projection end surface of a projected portion of a distribution block 83 according to another embodiment. Two opening portions each having a circular shape are formed on the projection end surface. One of the two opening portions has a radius R1 and the other has a radius R2. The radius R2 is preferably in a range between 0.5 times and 2 times of the radius R1.

Figure 14:
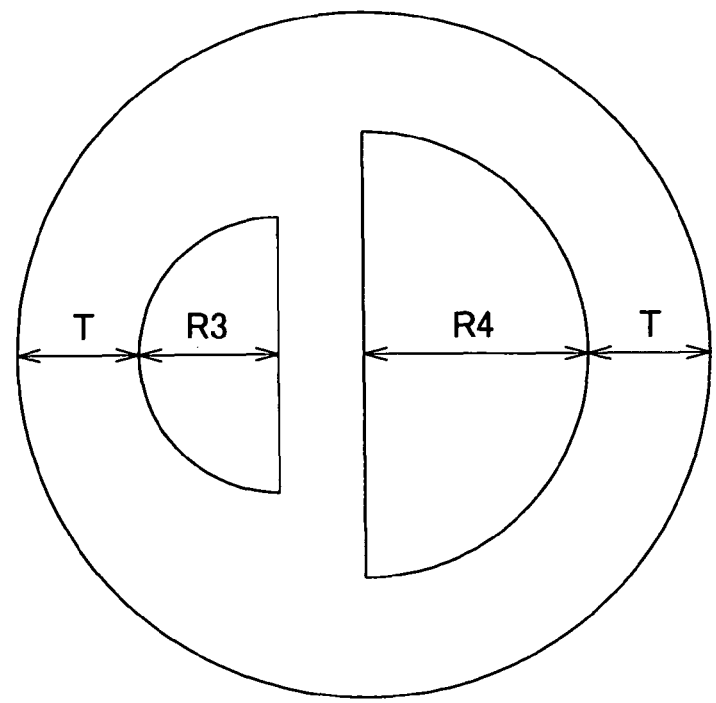
FIG. 14 is an enlarged view illustrating a projection end surface of a projected portion of a distribution block according to further another embodiment of the present invention.

Alternatively, the projected portion 83f has a projection end surface as shown in FIG. 14. FIG. 14 shows an enlarged view of a projection end surface of a projected portion of a distribution block according to further another embodiment. Two semicircular opening portions are formed on the projection end surface. One of the two opening portions has a radius R3 and the other has a radius R4. The radius R4 is preferably in a range between 0.5 times and 2 times of the radius R3. Here, the flow rate of the refrigerant flowing in the branch opening portion is preferably in a range between 0.3 times and 0.7 times of the flow rate of the refrigerant passing through the inflow passage.

In a case where the flow rate of the refrigerant into the branch opening portion is equal to or less than 0.3 times of the flow rate of the refrigerant passing through the inflow passage, the flow rate of the refrigerant into the ejector increases. If the flow rate of the refrigerant into the ejector is large, a surface temperature of the heat exchanging part of the second evaporator reduces due to large negative pressure. The gas and liquid two-phase refrigerant flowing in the second evaporator in which the surface temperature of the heat exchanging part is reduced immediately evaporates. As a result, temperature distribution of the air blown out from the second evaporator is degraded, resulting in deterioration of performance.

On the other hand, in a case where the flow rate of the refrigerant into the branch opening portion is equal to or greater than 0.7 times of the flow rate of the refrigerant passing through the inflow passage, the flow rate of the refrigerant into the ejector reduces. If the flow rate of the refrigerant into the ejector is small, negative pressure at the refrigerant suction port is reduced. If the negative pressure is insufficient, it is difficult to suction the refrigerant from the second evaporator by the ejector. In this case, it may result in a rupture of the cycle.

In the above embodiments and the above other embodiments, the projection end surface of the distribution block is configured such that the flow rate of the refrigerant into the branch opening portion is in a range between 0.3 times and 0.7 times of the flow rate of the refrigerant passing through the inflow passage. Therefore, the heat exchanger having high reliability can be provided.

In the above embodiment, in assembling the components of the integrated unit 20, components other than the ejector 14, that is, the first evaporator 15, the second evaporator 18, the passage-forming unit 80, the capillary tube 17a and the like are integrated by brazing. However, the integration of such components can be conduced in various other fixing ways, such as by screwing, crimping, welding, bonding or the like, other than brazing.

In the above embodiment, the present invention is applied to the vapor compression subcritical cycle in which the refrigerant, such as CFC-based refrigerant, HC-based refrigerant, does not exceed a critical pressure on a high pressure side. However, the present invention can be employed to a vapor compression supercritical cycle in which pressure of a refrigerant, such as carbon dioxide ($CO_2$), exceeds a supercritical pressure on a high pressure side.

In the supercritical cycle, the refrigerant discharged from the compressor radiates heat in the radiator 12 while maintaining a super critical condition, and thus does not condense. As a result, it is difficult for the liquid receiver 12a arranged on the high pressure side to exhibit a gas and liquid separating effect and a retaining effect of the surplus liquid refrigerant. Therefore, in the supercritical cycle, an accumulator is employed as a low pressure-side gas and liquid separator on the outlet side of the first evaporator 15.

In the above embodiment, the throttle device 17 is constructed of the capillary tube 17a. Alternatively, the throttle device 17 can be constructed of a fixed throttle hole, such as an orifice, an electric control valve in which a valve opening degree can be adjustable by an electric actuator, or the like.

In the above embodiment, as the ejector 14, a fixed ejector having the nozzle portion 14a with a constant passage area is exemplarily described. Alternatively, a variable ejector having a variable nozzle in which a passage area is variable can be employed as the ejector 14. As an example of the variable nozzle, a mechanism in which a position of a needle inserted in a passage of a variable nozzle is controlled by an electric actuator to adjust a passage area can be employed.

In the above embodiment, the present invention is exemplarily employed to a refrigerating cycle for performing the cooling operation of the passenger compartment of a vehicle and a freezer-refrigerator. However, the refrigerating cycle can be employed such that the first evaporator 15 whose refrigerant evaporation temperature is high and the second evaporator 18 whose refrigerant evaporation temperature is low are used for cooling different areas of the passenger compartment, such as for cooling a passenger compartment front seat area and a passenger compartment rear seat area.

Alternatively, both the first evaporator 15 whose refrigerant evaporation temperature is high and the second evaporator 18 whose refrigerant evaporation temperature is low are used for cooling the freezer-refrigerator. That is, the first evaporator 15 whose refrigerant evaporation temperature is high is used for cooling a refrigerator of the freezer-refrigerator and the second evaporator 18 whose refrigerant evaporation temperature is low is used for cooling a freezer of the freezer-refrigerator.

In the above embodiment, the thermal expansion valve 13 and the temperature sensing part 13a are constructed separately from the unit for the ejector-type refrigerating cycle. Alternatively, the thermal expansion valve 13 and the temperature sensing part 13a can be integrally assembled to the unit for the ejector-type refrigerating cycle. In this case, the refrigerant inlet 25 is located between the liquid receiver 12a and the thermal expansion valve 13, and the refrigerant outlet 26 is located between the passage on which the temperature sensing part 13a is disposed and the compressor 11.

In the above embodiment, it is described about the refrigerating cycle for a vehicle. However, the present invention can be employed to a fixed refrigerating cycle in a similar manner, other than the refrigerating cycle for a vehicle.

In the present embodiment, the projection end surface of the projected portion 83f is formed with the main opening portion 83b of the main passage 25a and the branch opening portion 83c of the branch passage 16. However, the projection end surface of the projected portion 83f can be formed with another opening portion of another passage, other than the main passage and the branch passage.

In the above embodiment, the ejector 14 is inserted in the upper tank 18*b* through the through hole 83*a* of the distribution block 83. However, the cap 43 can be formed with a hole for inserting the ejector.

In the above embodiment, the ejector 14 is fixed to the second evaporator 18 after the first and second evaporators, the passage-forming unit and the capillary tube 17*a* are integrated by brazing. Alternatively, the ejector 14 can be integrated with the first and second evaporators, the passage-forming unit and the capillary tube by brazing.

In the above embodiment, the main passage 25*a* has the axis that passes through the center of the circular cross-section of the through hole 83*a*. As such, the refrigerant flowing out from the main passage 25*a* enters the ejector 14 without whirling in the through hole 83*a*. Alternatively, the main passage 25*a* can have an axis offset from the center of the circular cross-section of the through hole 83*a*. In this case, the refrigerant entering the ejector 14 can be whirled.

Additional advantages and modifications will readily occur to those skilled in the art. The invention in its broader term is therefore not limited to the specific details, representative apparatus, and illustrative examples shown and described.

What is claimed is:

1. A heat exchanger comprising:
   a heat exchanging section that performs heat exchange between a refrigerant and a cooling medium; and
   a passage section having a first passage and a second passage for supplying the refrigerant to the heat exchanging section and a supply passage for supplying the refrigerant to the first passage and the second passage, wherein
   the passage section has a distribution surface defining an end of the supply passage and crossing an axis of the supply passage,
   the first passage and the second passage have a first opening portion and a second opening portion in the distribution surface, respectively,
   the distribution surface is disposed such that the refrigerant flowing in the supply passage is distributed into the first passage and the second passage through the first opening portion and the second opening portion; and
   a minimum first distance greater than zero between an opening edge of the first opening portion and an inner surface of the supply passage is equal to a minimum second distance greater than zero between an opening edge of the second opening portion and the inner surface of the supply passage, the inner surface extending parallel to the axis of the supply passage.

2. The heat exchanger according to claim 1, wherein the opening edge of the first opening portion and the opening edge of the second opening portion have a geometrically similar shape.

3. The heat exchanger according to claim 1, wherein the supply passage has a circular cross-section.

4. The heat exchanger according to claim 1, wherein
   the opening edge of the first opening portion includes an arcuate portion, and the minimum first distance with regard to the first opening portion is defined between the arcuate portion and the inner surface of the supply passage; and
   the opening edge of the second opening portion includes an arcuate portion, and the minimum second distance with regard to the second opening portion is defined between the arcuate portion and the inner surface of the supply passage.

5. The heat exchanger according to claim 4, wherein the arcuate portion of the opening edge of the first opening portion has a radius in a range between 0.5 times and 2 times of a radius of the arcuate portion of the opening edge of the second opening portion.

6. The heat exchanger according to claim 1, wherein the opening edge of the first opening portion and the opening edge of the second opening portion each have a circular shape.

7. The heat exchanger according to claim 1, wherein the first passage and the second passage are disposed such that axes thereof are parallel to an axis of the supply passage.

8. The heat exchanger according to claim 1, wherein the heat exchanging section includes:
   a first heat exchanging part;
   a second heat exchanging part disposed downstream of the first heat exchanging part with respect to a flow of the cooling medium;
   an ejector disposed between the first passage and the first heat exchanging part and having a refrigerant suction port for suctioning the refrigerant from the second heat exchanging part; and
   a decompressing part disposed between the second passage and the second heat exchanging part for decompressing the refrigerant.

9. The heat exchanger according to claim 8, wherein
   the passage section includes a distribution block,
   the distribution block has an insertion hole having a circular cross-section to allow the ejector to pass through and a distribution surface defining the end of the supply passage,
   the first passage and the second passage are provided in the distribution block,
   the first passage is configured such that an axis thereof is perpendicular to an axis of the insertion hole and the distribution surface,
   the second passage is configured such that an axis thereof is perpendicular to the distribution surface, and
   the distribution block is integrated with the heat exchanging section by brazing.

10. The heat exchanger according to claim 9, wherein the passage section further includes:
    a connection block defining a refrigerant inlet and a refrigerant outlet;
    a first plate member having a first groove portion; and
    a second plate member having a second groove portion, wherein
    the first plate member and the second plate member are joined to each other such that the first groove portion and the second groove portion form the supply passage, and
    the connection block is connected to the first and second plate members such that the refrigerant inlet is in communication with the supply passage.

11. The heat exchanger according to claim 10, further comprising:
    a tank part, wherein
    the passage section is disposed at an end of the tank part with respect to a longitudinal direction of the tank part,
    the first and second plate members define an outflow passage that is in communication with the refrigerant outlet, and
    the outflow passage is configured to conduct the refrigerant having passed through the first heat exchanging part to the refrigerant outlet.

12. The heat exchanger according to claim 10, wherein the first plate member has an opening at its center, and the distribution block is disposed in the opening provided at the center of the first plate member.

13. The heat exchanger according to claim 1, wherein the distribution surface is perpendicular to a longitudinal axis of the supply passage.

14. The heat exchanger according to claim 1, wherein the distribution surface is perpendicular to a flowing direction of the refrigerant in the supply passage.

15. The heat exchanger according to claim 14, wherein the distribution surface includes a curved edge, the minimum first and second distances extending along the distribution surface between the curved edge and the first and second opening portions, respectively.

16. The heat exchanger according to claim 1, wherein the minimum first and second distance extend parallel to the distribution surface.

17. The heat exchanger according to claim 1, wherein the minimum first and second distances extend perpendicular to a flowing direction of the refrigerant in the supply passage.

18. The heat exchanger according to claim 17, wherein the distribution surface includes a curved edge, the minimum first and second distances extending along the distribution surface between the curved edge and the first and second opening portions, respectively.

19. The heat exchanger according to claim 1, wherein the distribution surface includes a curved edge, the minimum first and second distances extending along the distribution surface between the curved edge and the first and second opening portions, respectively.

* * * * *